J. A. BOWDEN.
TIRE VALVE.
APPLICATION FILED OCT. 21, 1912. RENEWED DEC. 18, 1914.
1,174,117. Patented Mar. 7, 1916.
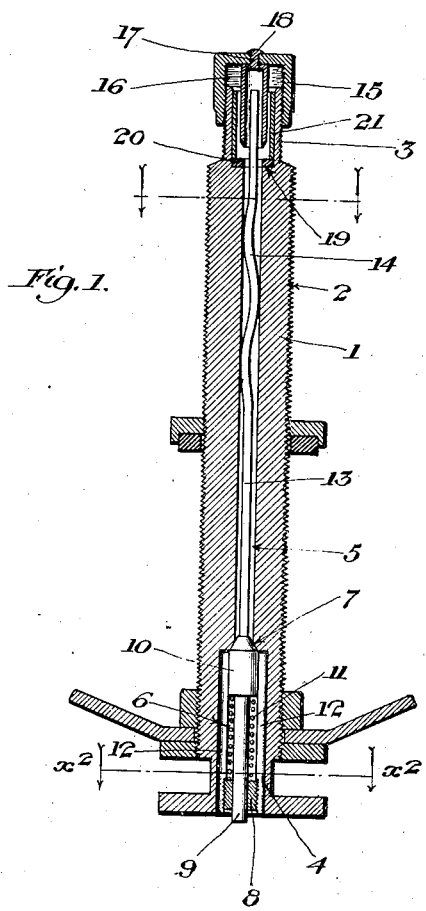
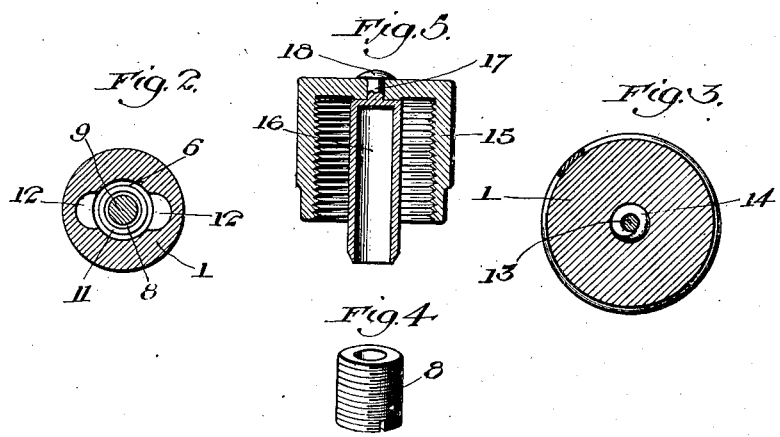
Witnesses:
Inventor:
Junius A. Bowden,
by Lyon & Gaerley
attys United States Patent Office.

JUNIUS A. BOWDEN, OF LOS ANGELES, CALIFORNIA, ASSIGNOR TO A. SCHRADER'S SON, INCORPORATED, OF NEW YORK, N. Y., A CORPORATION OF NEW YORK.

TIRE-VALVE.

1,174,117.　　　Specification of Letters Patent.　　Patented Mar. 7, 1916.

Application filed October 21, 1912, Serial No. 727,082. Renewed December 18, 1914. Serial No. 877,975.

*To all whom it may concern:*

Be it known that I, JUNIUS A. BOWDEN, a citizen of the United States, residing at Los Angeles, in the county of Los Angeles and State of California, have invented a new and useful Tire-Valve, of which the following is a specification.

This invention relates to a valve adapted for use on pneumatic tires, and the object of the improvement is to provide a valve with less inner parts and so constructed that they will not stick from long standing, and to provide an inner valve mechanism that will never require renewing on account of air leaks; it not being the intention of stopping air from escaping through the valve. In other words, the object is to provide a valve that is not airtight, but that will permit a slow outward leak and a valve mechanism that will easily open wide inwardly, for the purpose of inflating or deflating the tire. The object in producing the slow outward leak is to provide for admitting air to pressure gages which may be applied to the valve stem for indicating the pressure of air within the tire.

One of the essential features of the invention is to provide a cap that will positively close off the air, this air cap to be removed when a pressure gage is applied and to so construct the cap that an airtight joint is formed which is not subject to impairment by defacement of the exterior surface of the inlet passages to the valve, which impairment is now prevalent on tire valves in universal use.

A further advantage is gained by locating the outer air closure within the stem in that the closure area is much less than when at the outer end.

Another object is to provide a greater free air passage for inflation without increasing the size of the standard tire valve or body now in universal use.

Another object is to provide for attaching both kinds of air pressure gages, to-wit, one that is momentarily pressed against the tire valve and pressure noted, and one that is permanently attached, so that in either case no manipulation of the inner valve is necessary to secure air communication from the tire to the gage. In accomplishing this purpose and adapting the universal tire valve body, I provide a novel plan of securing an increased air passage without appreciably weakening the strength of the metal in the small part of the regular valve stem which is reduced in diameter at the point of attachment to the inner tube of the tire and which, in my device, contains a part of the inner valve mechanism.

Further objects and advantages will be brought out in the following description.

Referring to the drawings: Figure 1 is a longitudinal section through the device. Fig. 2 is a section on line $x^2$—$x^2$, Fig. 1. Fig. 3 is a section on line $x^3$—$x^3$, Fig. 1. Fig. 4 is a perspective of the retaining sleeve. Fig 5 is an enlarged longitudinal section of the cap portion of the mechanism.

1 designates the valve stem which externally is of the dimensions and shape now in universal use and externally threaded at 2 and with a reduced end portion 3 externally threaded. At the inner end the stem 1 has a reduced neck 4 to receive the inner tube. Ordinarily the inner valve mechanism is located within the outer portion of the valve stem 1, but in the present case as will be seen, this would not permit of the employment of the cap mechanism herein shown, and for that reason I locate the inner valve at the inner end of the valve stem, and yet provide an operative connection whereby the inner valve may be operated from a point at the outer end of the valve stem, substantially as in the ordinary form now in use.

Extending in the main portion of the stem 1 is the central air conduit 5, which is of the size now generally in use. The inner end of the valve stem is bored out with a central passage or chamber 6 of slightly larger diameter than the conduit 5, forming a shoulder or valve seat 7, and the outer portion of said bore is internally threaded for a short distance to receive a nut 8 which is bored centrally to slidably receive the inner pin 9 of a valve 10, the latter having a conical face adapted to seat against the shoulder 7 and while preventing any rapid outward movement of air, will provide for a slow outward leakage of air at this point. Encircling the inner pin is a coil compression spring 11 which is a very light spring, one end of which bears against the nut 8 and the other against the valve 10 and serves to lightly hold the valve 10 against its seat, so that it will not oppose any appreciable resistance to the inward movement of air when the inner tire is being inflated, which thereby renders the inflation much easier than in the ordinary valve now in use. The nut 8 acts as a guide for the inner pin 9 and as an abutment for the spring 11, and in order to form a passage for air past this nut, I provide two air passages 12, each semicircular in cross section as clearly shown in Fig. 2, and which extend inwardly as far as the shoulder 7. By forming the two air passages 12 in this manner, I secure a large air carrying capacity for carrying air past the nut 8 and without materially weakening the reduced neck 4. Extending from the other end of the valve 10 is an outer pin 13 which extends to the outer end of the valve stem and is guided and maintained in a central position by one or more coils 14.

The valve 10 may easily be opened by depressing the outer end of the outer pin 13 whenever it is desired to deflate the tire. A cap 15 is screwed on the outer end of the valve stem and carries a hollow pin 16 which has a reduced neck 17 journaled in the cap 15 with a head 18 which permanently retains the pin on the cap. The inner end of the hollow pin is beveled, as shown. The hollow pin 16 receives the outer end of the pin 14, loosely. The reduced portion 3 of the valve stem is bored with a larger diameter than the air conduit 5, to form a shoulder 19 on which is a yielding valve seat 20 formed of any desired material, as, for example, hard fiber. This valve seat is retained in position by a lining sleeve 21 which enables the valve seat 20 to be removed and replaced should it be desired. The beveled inner end of the hollow pin 16 seats against the inner edge of the seat 20 when the cap 15 is screwed down and thus forms an airtight closure which prevents leakage of air, it being understood that there is designedly a leakage from the inner valve 10, this leakage being utilized for the operation of pressure gages and necessitating coöperation of the outer valve to form the normal airtight joint condition of the valve mechanism.

The seat 19 being located at a considerable distance within the end of the valve stem is entirely protected and can not be defaced. It will, therefore, not require replacement and the closure will be more perfect on account of the perfect valve seat which will be maintained at all times. Furthermore, the small area of the end of the pin 16 makes it much easier to produce a perfect fit of the closure parts with resulting non-leakage of air.

A material advantage is the greater ease of inflation attained by this construction by virtue of the easier opening valve 10 and of the enlarged air passages. While ordinarily it is a simple matter to increase the size of an air passage to facilitate the passage of air, such is not the case in the present instance, as to do so would so weaken the contracted neck of the valve stem that it would be practically unfit for actual service, and for this reason the unique construction which I have provided is of great value in that although the increased air passage area is secured, the valve stem is not weakened thereby. For example, the passage 5 in my present construction is the same as the corresponding air passage in the valve now in universal use, for example, 3/32nds of an inch. The pin 13 of my valve is substantially 3/64ths which is the same size as the corresponding pin in the valve in universal use. But in the valve in universal use, the passage corresponding to my passage 5 is closed by a valve seat member, which member has a reduced passage of less area than my passage 5, through which the pin corresponding to pin 13 passes, and which has a less area of air passage surrounding its pin than my air passage 5, the reduced air passage in said valve in universal use being substantially 5/64ths of an inch in diameter. Thus, the effective net area in my device is .00517 square inch, while in the valve referred to, the effective diameter of air passage is the difference of hole area of 5/64ths inch equal .00468 square inch and pin area of 3/64ths inch diameter equal .00173 square inch area, thus making a net area of air passage of .00295 square inch. Thus my construction giving .00517 and the other giving .00295 shows my construction to give .00222 square inch greater area, an area which is approximately 70% greater.

What I claim is:

1. A tire valve comprising a stem, a pin extending the entire length of said stem, said stem having a longitudinal air passage in which said pin lies, and a valve in the inner end of said stem carried by said pin, said pin having a coil formed therein and bearing against the wall of the air passage to guide the outer end of the pin.

2. A tire valve comprising a valve stem having a longitudinal air passage, the inner end of the valve stem having an enlarged recess forming a valve seat near the inner end of the stem, a sleeve secured in the inner end of the stem, said stem being formed with a pair of air passages on opposite sides of said sleeve communicating with said recess, a pin having one end slidable in said sleeve, a valve mounted on said pin, and a spring between said valve and sleeve, said pin extending beyond said valve to the opposite end of said stem.

3. A tire valve comprising a stem formed with a reduced neck in its inner end for the attachment to the air tube of the tire, said stem having a longitudinal air passage throughout its length and also having an enlarged bore in the said reduced neck and having an eccentrically located air passage in the said reduced neck communicating with the enlarged bore, a sleeve screwed in the enlarged bore, there being a valve seat formed at the end of the enlarged bore, a valve on said seat, a pin slidable in said sleeve and carrying said valve, and a spring between said sleeve and valve.

4. A tire valve comprising a stem, a valve in the inner end thereof opening toward said inner end, a pin extending from said valve to the outer end of the stem, a cap screwed on the outer end of the stem, a hollow pin carried by said cap and telescoping with the outer end of the first pin, the outer end of the valve stem having an enlarged bore, a shoulder at the inner end of the enlarged bore, an annular seat of yielding material secured on said shoulder, the innermost end of the hollow pin resting against the annular seat, said hollow pin having an imperforate end and formed with a reduced neck which extends through said cap, and a head on the end of said neck outside the cap.

5. A tire valve comprising a valve stem, a valve in the inner end thereof opening toward said inner end, a spring closing said valve, a pin extending from said valve to the outer end of the stem, the stem having a longitudinal air passage in which the pin lies, the outer end of the stem having an enlarged bore, a valve seat formed of yielding material at the inner end of the enlarged bore, the outer end of the valve stem being externally threaded, a cap screwed on the outer end of the valve stem, a hollow pin revolubly carried by said cap and with a beveled inner end seated against said yielding material, said hollow pin receiving the outer end of the first pin.

6. In combination, a stem for pneumatic tires, a valve in the stem, a pin extending from said valve to substantially the outer end of the stem, a cap screwed to the outer end of the stem, a hollow pin carried by said cap and slidably receiving the outer end of the first pin, the outer end of the valve stem having an inner annular shoulder, a seat formed of yielding material secured on said shoulder independently of the hollow pin, the end of the hollow pin being adapted to bear against said seat when the cap is screwed down.

7. A tire valve comprising a stem, a valve therein, a pin extending from said valve to substantially the outermost end of the stem, a cap screwed to the outer end of the stem, a hollow pin carried by said cap and slidably receiving the outer end of the first pin, the hollow pin being closed at one end, and the said closed end extending through the head of the cap and swiveled thereon.

8. A valve stem for pneumatic tires having an enlarged opening in the outer end thereof forming a shoulder, a valve seat on said shoulder and a lining sleeve slidably fitting and frictionally engaging the inner wall of the enlarged opening and bearing against the seat to constantly hold the seat in place in airtight engagement with said shoulder.

9. In a tire valve, a valve stem, a valve therein opening toward the inner end of the stem, a solid pin extending from said valve to the outer end of the stem, the outer end of the stem having an enlarged bore, a seat of yielding material at the inner end of the enlarged bore, a sleeve in said enlarged bore adapted to hold said yielding material in a permanent position at the inner end of the enlarged bore, a cap screwed to the outer end of the valve stem, a hollow pin carried by said cap, the hollow pin adapted to slidably receive the solid pin, the inner end of the hollow pin adapted to seat against said yielding material.

10. In a tire valve, a body having an interior bore, a valve seat therein, a hollow cap having a tubular projecting portion swiveled to its base and adapted to contact with said seat and close said bore, said tubular projecting portion being adapted to receive the deflating pin of a valve.

11. In a tire valve, a body having an interior bore, a valve seat therein, a hollow screw-threaded cap having a tubular projecting portion swiveled to its base and adapted to contact with said seat and close said bore, said cap being unlimited by said valve body in the movement of its projection against said seat, said tubular projecting portion being adapted to receive the deflating pin of a valve.

In testimony whereof I have hereunto set my hand at Los Angeles, California, this 12 day of October, 1912.

JUNIUS A. BOWDEN.

In presence of—
GEORGE T. HACKLEY,
MARTHA M. LANGE.